April 28, 1953 J. R. PIERCE 2,636,948

HIGH-FREQUENCY AMPLIFIER

Filed Jan. 11, 1946 5 Sheets-Sheet 1

INVENTOR
J. R. PIERCE
BY H. A. Burgess
ATTORNEY

INVENTOR
J. R. PIERCE
BY H. A. Burgess
ATTORNEY

April 28, 1953 J. R. PIERCE 2,636,948

HIGH-FREQUENCY AMPLIFIER

Filed Jan. 11, 1946 5 Sheets-Sheet 3

INVENTOR
J. R. PIERCE
BY H. A. Burgess
ATTORNEY

April 28, 1953 J. R. PIERCE 2,636,948

HIGH-FREQUENCY AMPLIFIER

Filed Jan. 11, 1946 5 Sheets-Sheet 4

INVENTOR
J. R. PIERCE
BY H. A. Burgess
ATTORNEY

April 28, 1953

J. R. PIERCE 2,636,948

HIGH-FREQUENCY AMPLIFIER

Filed Jan. 11, 1946

5 Sheets–Sheet 5

INVENTOR
J. R. PIERCE
BY H. A. Burgess
ATTORNEY

Patented Apr. 28, 1953 2,636,948

UNITED STATES PATENT OFFICE 2,636,948

HIGH-FREQUENCY AMPLIFIER

John R. Pierce, Millburn, N. J., assignor to Bell Telephone Laboratories, Incorporated, New York, N. Y., a corporation of New York Application January 11, 1946, Serial No. 640,597

50 Claims. (Cl. 179—171)

This invention relates to devices for amplifying high frequency electrical waves, particularly such devices in which amplification is had through interaction between an electron stream and a high frequency electric field associated with the waves to be amplified over an extended distance such as a distance of more than a wavelength along the transmission path of the wave. It relates also particularly to such devices arranged to couple efficiently into a transmission system and be suitable for transmitting a relatively wide band of frequencies.

A principal object of the invention is to provide high frequency amplifying devices capable of high amplification over a wide band of frequencies.

A further object is to provide for insertion into a high frequency transmission system an amplifying device capable of efficient cooperation with the system over a wide band of frequencies.

Another object is to provide for insertion into a transmission path an electronic amplifying device which though deenergized to stop the electron flow does not block transmission through the path.

Many difficulties have been encountered in the operation of electronic amplifiers at very high frequencies. Circuit and radiation losses, grid input losses and difficulty of maintaining driving voltages and circuit impedances are among the various handicaps, some of which it has been sought to overcome by the use of low loss resonant circuits, the velocity variation method of operation and other expedients. Though advances have been made, limitations of both apparatus and methods of operation have prevented the type of over-all performance often desired, particularly with respect to frequency band width and magnitude of amplification. With the present invention many of the restrictions imposed by such limitations are avoided.

The invention utilizes circuit arrangements wherein a portion of the transmission path of the wave to be amplified is incorporated into the electronic amplifying device. The arrangement is such that the electric field associated with the traveling wave is traversed by the electron stream in the direction of travel of the field and the velocities of travel of the field and of the electron stream are of the same order of magnitude. Under such a condition the electric field acts on the electron stream and the electron stream reacts on the field in such a manner that the wave traveling along the path in the same direction as the electron stream increases in amplitude with distance while a wave traveling against the stream is little affected by the presence of the electrons. Thus, the device acts as an amplifier for waves traveling in the same direction as the electron stream.

The applicant has found that in the employment of such an arrangement certain precautions are necessary and that by suitably designing and coordinating the components of the device enhanced performance may be had. Important in this connection are high frequency coupling arrangements, means to prevent high frequency radiation from the device and means for appropriately introducing high frequency transmission loss.

The invention with respect to these components and with respect also to the complete device of which they are parts will be understood from the following detailed description and the accompanying drawings, in which:

Fig. 1 shows an embodiment of the invention in which the wave transmission path through the amplifying device comprises a helical coil of solid conductor with coupling thereto by means of coaxial transmission lines;

Fig. 1–A illustrates an alternative method of introducing high frequency loss into the helical coil path;

Figure 3:
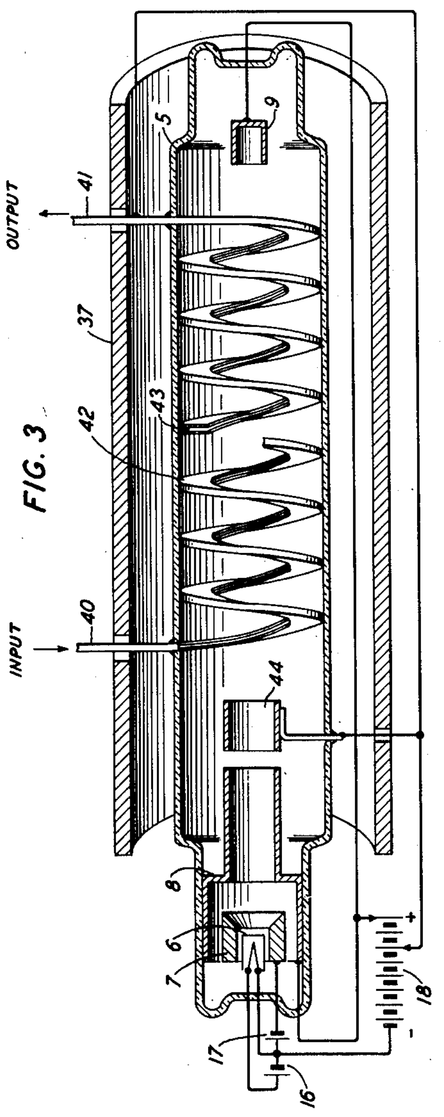
Fig. 3 shows an embodiment in which the wave transmission path through the amplifying device comprises a helical coil formed by coiling a wave guide.
Figure 4:
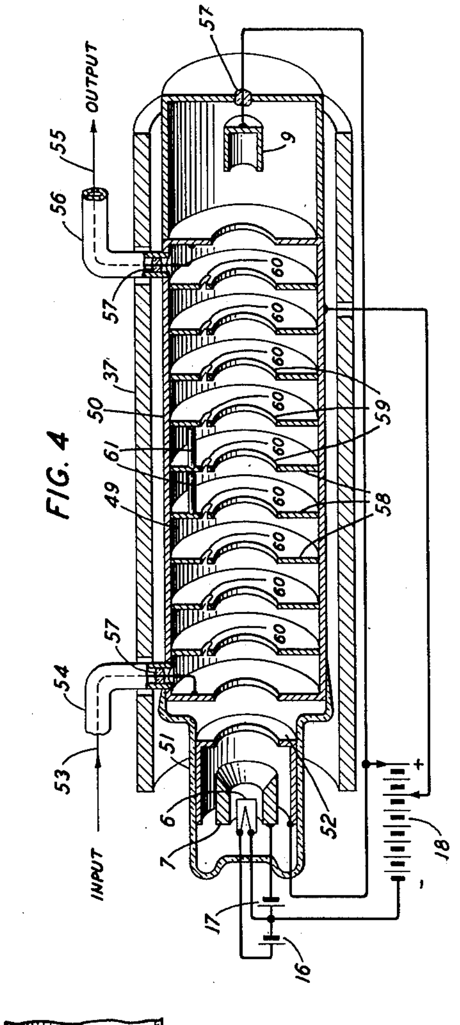
Figure 3A:
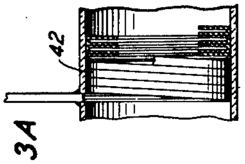
Figure 5:
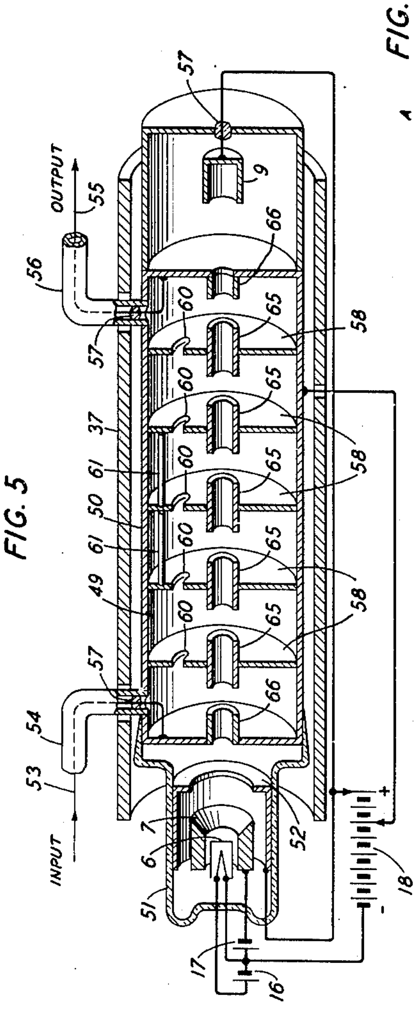

Fig. 3–A illustrates an alternative detail of Fig. 3;

Fig. 4 illustrates an embodiment in which the wave transmission path through the device comprises a wave guide loaded by spaced transverse baffles which at spaced intervals constrict the cross-sectional area of the guide;

Fig. 5 illustrates a modification of Fig. 4 in which the central apertures in the baffles are fitted with cylinders extending longitudinally along the guide to introduce filter circuit characteristics;

Figs. 5–A and 5–B illustrate different arrangements of openings which may be used in the baffles of Figs. 4 or 5.

Figures 6A, 6B:
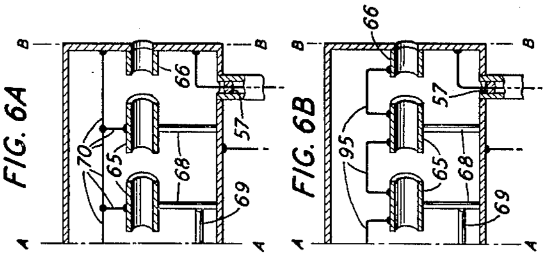
Figure 6:
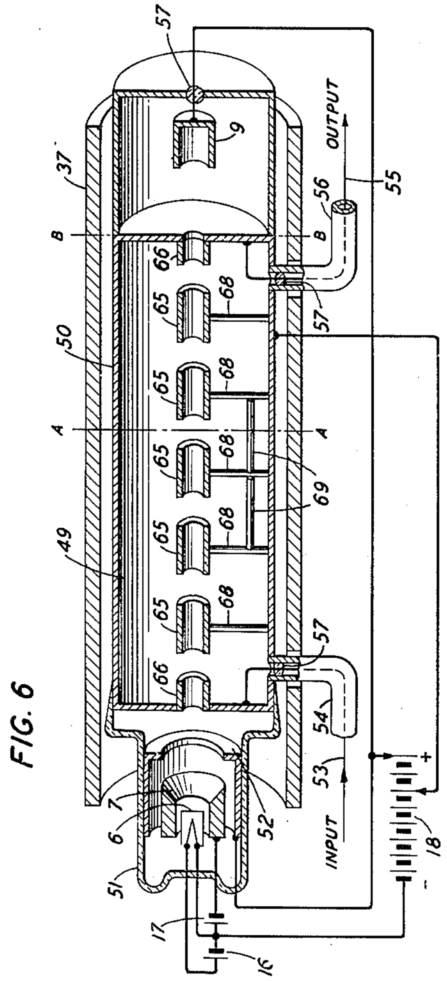
Figure 5A:
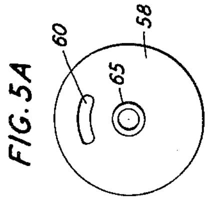
Figure 5B:
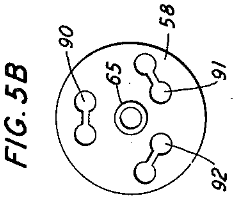
Figure 7:
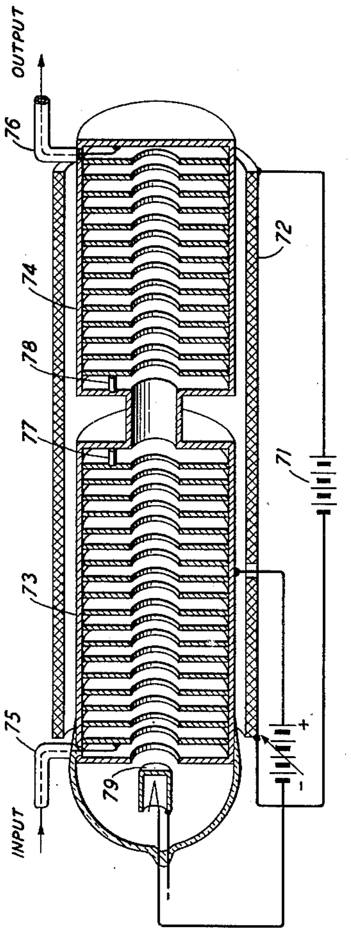
Figure 8:
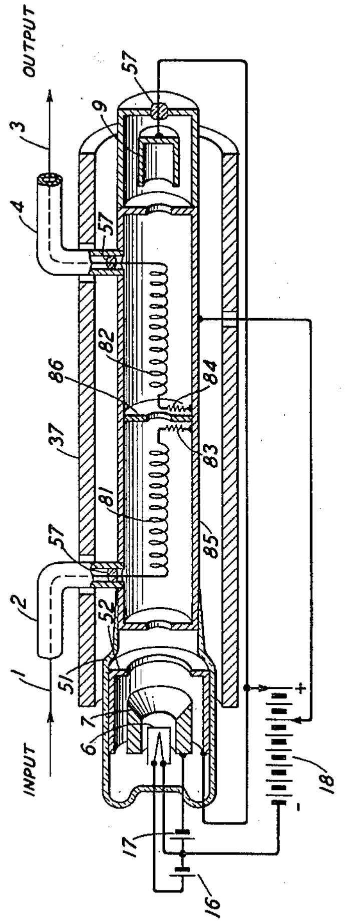
Figure 9:
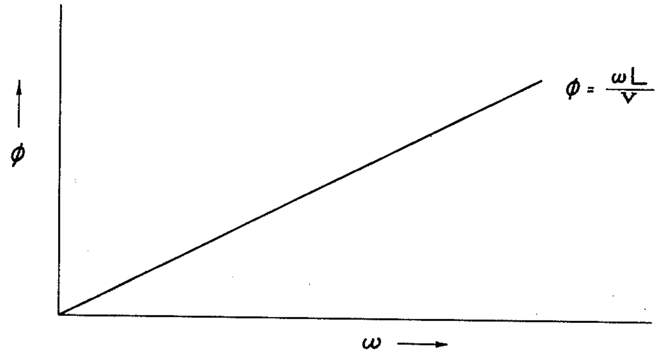
Figure 10:
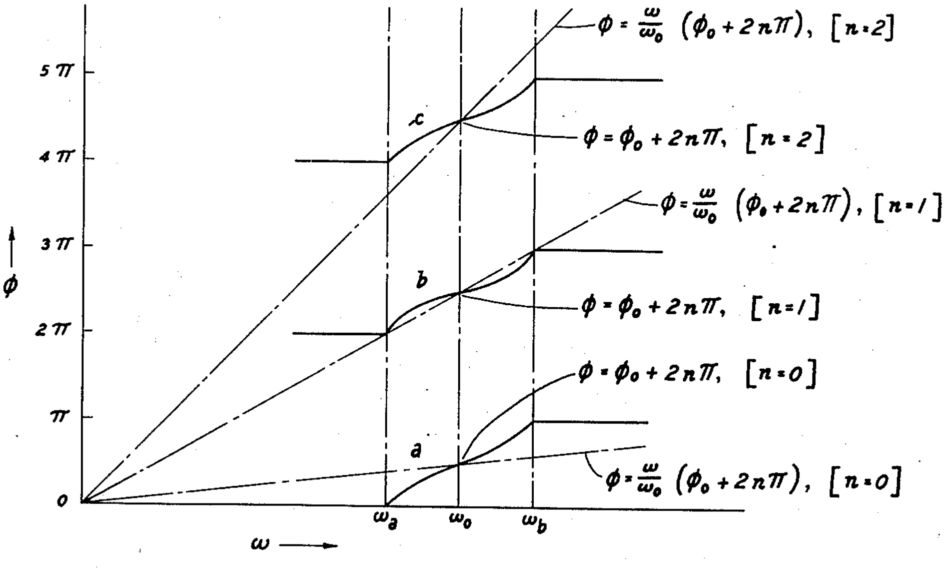

Fig. 6 shows a further modification of Fig. 4 wherein the baffles are reduced to conducting strips or pedestals by which the cylinders of Fig. 5 are supported;

Fig. 6–A shows a modification of Fig. 6 in which interconnections between the cylinders are added to alter the filter circuit characteristic and provide means for adjustment of the characteristic;

Fig. 6–B shows an alternative method of making the additional interconnections of Fig. 6–A;

Fig. 7 is a copy of a figure from a copending application to illustrate a related type of device; and Fig. 8 shows how certain features of the present invention may be adapted to a device of the type illustrated in Fig. 7; and Figs. 9 and 10 are diagrams explanatory to the Fig. 5 and Fig. 6 embodiments.

Figure 1A:
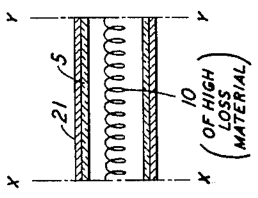
Figure 1:
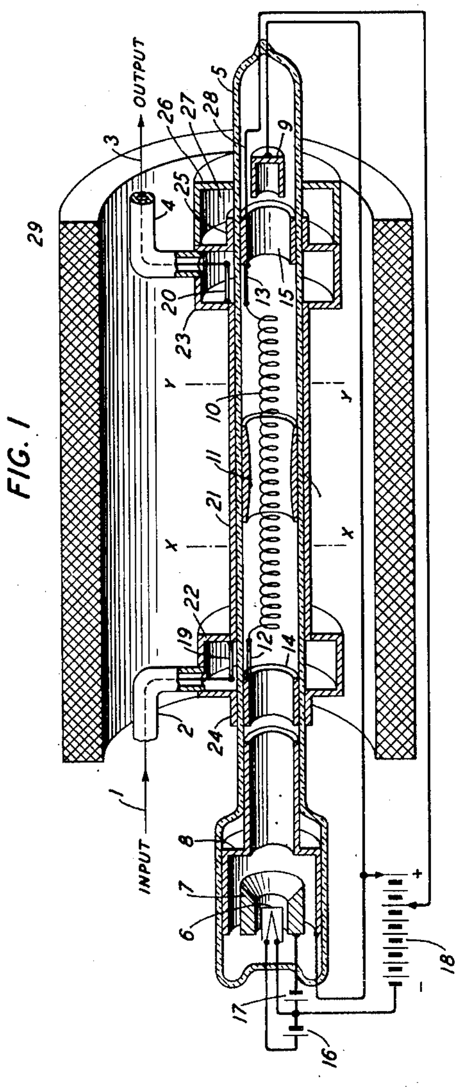

The Fig. 1 embodiment of the invention is a wave amplifying device arranged for insertion into a coaxial line transmission circuit. The coaxial line is broken and the input end of the device is connected to the line end designated 1, 2. The output end of the device is connected to the line end designated 3, 4. The device comprises an evacuated envelope 5 containing an electron emitting cathode 6 which may be indirectly heated as shown, an electron focussing electrode 7, an accelerating electrode 8, a collecting electrode 9, the helical coil 10, high frequency loss material 11, coupling members 12 and 13 and the coil terminating cylindrical members 14 and 15. The cathode is heated from potential source 16 and the focussing electrode is biassed from source 17. Electrodes 8 and 9, the helical coil 10 and the members connected to it are biased positively with respect to the cathode through connections to source 18 so that a stream of electrons is projected from the cathode, through the coil along its axis at a suitable velocity and to the collector 9. A solenoid 29 is shown surrounding the coil 10 to provide a strong unidirectional magnetic field along the axis thereof and so prevent deviation of the electron stream from its desired course by an outside magnetic influence such as that of the earth's magnetic field. Each end of the helical coil is coupled to the appropriate coaxial line end. For instance, the input end of the coil (at the input end of the device) is coupled to the coaxial line 1, 2 through the proximity of strip member 12 (joining the end of the coil to the cylindrical member 14) and the strip member 19 (joining the central conductor 1 of the coaxial line to the outer conductor 2 through the interconnected shielding member 22). The lengths of the coupling strip members 12 and 19 are preferably the same and substantially electrically one quarter or $$\left(\frac{n}{2}+\frac{1}{4}\right)$$

of the wavelength of the wave to be amplified where $n$ is an integer. The degree of coupling between the members 12 and 19 may be varied by rotating the envelope 5 about its axis to vary their proximity. The output end of the coil is coupled to the coaxial line 3, 4 in the same manner through the proximity of the strip members 13 and 20.

The members 21, 22, 23, 24 and 25 (of conducting material) are electrically connected and serve to enclose and shield the helical coil, its end terminations, the coaxial line end portions and the arrangements for coupling the coil and the coaxial line. The proximity of member 14 and the tubular portion of 24 at the input end of the coil and of member 15 and the tubular portion of 25 at the output end of the coil causes these members to form by-pass capacitances to prevent the leakage of high frequency energy. The members 26 and 25 together form a toroidal-shaped cavity resonator with a gap 27 which is in close proximity to the lead 28 connecting members 15 to source 18. This resonator is tuned in the operating frequency range and being coupled to the lead 28 it acts as a choke and prevents excessive high frequency loss through that lead. If a lead is brought out at the input end of the helix, or it is otherwise desirable, a similar choke may be employed there, in which case the member 24 may serve as part of the hollow resonator.

The loss material 11 is shown as a hollow cylinder having the wall thickness tapering along the axis from the center and encircling the helical coil in the region of its longitudinal center. This material may be a mixture of ceramic and conducting material or other substance capable of absorbing energy from a high frequency field. The material may be shaped and distributed along the helix in any suitable manner to distribute the loss introduced by the energy absorption along the helix as desired. The introduction of controlled high frequency loss along the wave transmission path (which in this embodiment comprises the helical coil 10) is an important feature of the invention because the amount of amplification possible with the device may be seriously limited by self-oscillation due to high frequency energy being transmitted in the reverse direction from the output end to the input end. The tendency toward such oscillation may be controlled by this introduction of transmission loss. The loss may be distributed uniformly along all or part of the transmission path between the input and output of the device. However, the applicant has found that under some conditions at least it is advantageous to distribute the loss non-uniformly and while due to the limited information available he does not wish to be so restricted it appears from present experience that it is more desirable to concentrate the loss near the center of the device rather than at the ends.

As an alternative to the insertion of energy absorbing material such as 11 in Fig. 1 other means may be employed to insert high frequency loss. One such alternative is indicated in Fig. 1–A which shows the central portion of a device such as that of Fig. 1 in which rather than incorporating loss material such as 11 in Fig. 1 the helical coil itself is constructed of material having controllable loss. Thus, the coil conductor may be of high loss material such as resistance wire or it may be of low loss material plated with iron or other high loss material or a conductor of high loss material may be plated with low loss material and in any case the loss so introduced may be either uniformly or non-uniformly distributed as desired.

The axial length of the coil is preferably several wavelengths and it appears from present knowledge that it may be as long as practical considerations permit.

In operation, the input high frequency wave reaches the device over the coaxial line conductors 1 and 2. It reaches the coupling strip 19 (which as mentioned is preferably one-quarter or $$\left(\frac{n}{2}+\frac{1}{4}\right)$$

electrical wavelength long where $n$ is an integer and is transferred to the input end of the helical coil 10 through the coupling between strip 19 and strip 12 (which also is preferably one-quarter or $$\left(\frac{n}{2}+\frac{1}{4}\right)$$

electrical wavelength long). The wave traverses the coil 10 to the coupling strip 13 at the output end of the coil. It is then transferred to the strip 20 by the coupling between 13 and 20 (both of which are preferably one-quarter or $$\left(\frac{n}{2}+\frac{1}{4}\right)$$

electrical wavelength long) and thence delivered to the coaxial line 3, 4. Thus, there is a direct path for the high frequency wave through the device regardless of the electronic features. The high frequency path between the input and output ends of the helical coil is such that though the speed of the wave along the wire of the helix be about the same as that of light the speed of the wave along the axis of the helix may be a small fraction of that and comparable to an electron speed corresponding to a reasonable accelerating voltage. Since, for amplification of the wave it is necessary that the wave velocity along the axis of the coil be comparable to the electron velocity therealong, the coil dimensions (taking into consideration the frequency of the wave to be amplified), the dimensions of the electron tube and the electron accelerating voltages are correlated to attain that end. Close agreement between these velocities is desirable though some tolerance is obviously necessary and unavoidable when the wave covers a wide frequency band. Close figures on permissible tolerance are not available. It appears, however, that the velocities should be well within 10 per cent of agreement but possibly a 25 per cent departure may be permissible. At the present time it appears that the term "comparable" used above or the phrases "substantially the same" or "substantially equal" when used to describe the relationship of the two velocities should be understood to permit a tolerance of as much as 25 per cent. In practice, with given apparatus and operating frequency range the electron velocity may be adjusted to give optimum performance.

Any suitable high frequency source and load may be connected to the input and output coaxial terminals of the device.

Early tests of an arrangement similar to the Fig. 1 embodiment with the Fig. 1-A modification indicated an amplification gain of over 10 decibels over a band width of more than 200 megacycles at a wavelength about 11 centimeters. The helical coil having 13 turns per inch was one-quarter inch in diameter and 16 inches long. An electron accelerating voltage of 2,000 was employed.

Figure 2:
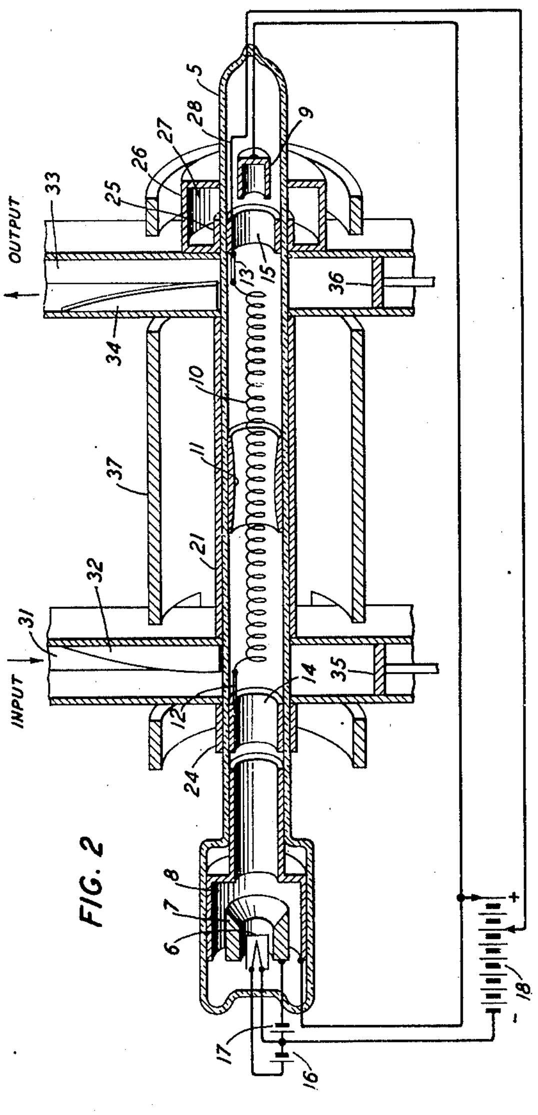
Fig. 2 is similar to Fig. 1 except that coupling to the helical coil is by means of hollow wave guides.

Fig. 2 illustrates an arrangement employing a helical coil transmission path as shown in Fig. 1 but in which the transmission path external to the device is a wave guide and the couplings at the ends of the coil are therefore to a wave guide structure rather than to a coaxial line structure as in Fig. 1. The wave guide transmission path external to the amplifying device is broken making two end portions 31 and 33 between which the helix of the device is inserted. The guide shown is of rectangular cross-section and the two end portions are placed parallel to each other so that the evacuated envelope 5 of the amplifying device may be inserted through both guide portions transversely and also the shielding members 21, 24 and 25 and so that the helical coil 10 completes the transmission path between the end portions of guide. As in Fig. 1, wave energy coupling to the input and output ends of the helical coil 10 is effected through the one-quarter or $$\left(\frac{n}{2}+\frac{1}{4}\right)$$

wavelength coupling strips 12 and 13. Tapered fins of conducting material 32 and 34 are placed in the guide portions as shown to concentrate the field and increase the possible coupling with the strips 12 and 13, respectively. The degree of coupling to these strips may be varied by rotating the envelope 5 about its axis to change the spacings between the strips 12 and 13 and the fins 32 and 34. Maximum coupling is had when the strips are closest to the gap between the fin and the opposite wall of the guide. The guide portions are extended beyond the intersections with the helix and are closed at the ends by the adjustable plungers 35 and 36. By these, the lengths beyond the coupling strips 12 and 13 may be adjusted as, for instance, to one-quarter or $$\left(\frac{n}{2}+\frac{1}{4}\right)$$

wavelength so that with the one-quarter or $$\left(\frac{n}{2}+\frac{1}{4}\right)$$

wavelength strips 12 and 13, each end of the helix is coupled to the appropriate wave guide portion by two coupled tuned circuits which as is well known may be adjusted to pass a band of frequencies in the manner of a bandpass filter. At the input end of the helix one of the tuned circuits is the strip 12 and the other the portion of wave guide between 12 and the plunger 35. At the output end of the helix the two tuned circuits are the strip 13 and the portion of guide between 13 and the plunger 36.

The loss material 11, the by-pass capacitances between members 14 and 24 and between 15 and 25, the resonant choke formed by members 25 and 26 and the general operation of the arrangement of Fig. 2 are the same as described in connection with Fig. 1. In place of the solenoid 29 of Fig. 1 a shield 37 is shown. The shield 37 may be of soft iron and serves to protect the device from external magnetic fields. Either a solenoid such as 29 of Fig. 1 or the shield 37 of Fig. 2 or both together may be used for that purpose. Any suitable input source and output load may be connected to the input and output guide portions.

Fig. 3 illustrates an arrangement in which rather than a wire helix as shown in Figs. 1 and 2 a wave guide structure is formed into a helix 42 along the axis of which the wave may travel at approximately the velocity of the electron stream and thereby derive energy from it. In Fig. 3 the wave guide which provides the transmission path external to the amplifying device is not broken, as drawn in the center of the figure to show the cross-section and interior, but continues through the device. Along the path of the electron stream the guide is formed into a helix surrounding the electron stream. The wall of the guide facing inwardly toward the axis of the helix and the electron stream is opened so that the electric field associated with a wave transmitted through the guide may extend out from the interior of the guide into the path of the electron stream and interact therewith.

The components of the device which correspond to those of Fig. 1 or Fig. 2 and function the same are designated the same as in those figures. In general, the evacuated envelope and the electronic features of Fig. 3 are the same as in Fig. 1. An additional accelerating electrode 44 is shown. In Fig. 3 it is, of course, necessary that the wave guide enter and leave the envelope through air-tight seals.

The high frequency wave enters the helix from the portion of guide designated 40 and leaves the helix through the portion of guide designated 41. Due to the helical formation of the guide the velocity of the wave along the axis of the helix is caused to be substantially the same as the velocity of the electron stream traveling along the axis in the same direction and as explained in connection with Fig. 1 this is a condition under which amplification of the wave may be had due to the transfer of energy from the electron stream to the axial high frequency field associated with the wave. The arrangement will therefore function as an amplifier in the same manner as Fig. 1 and as described in connection therewith. In order to provide a desired amount of high frequency attenuation in the device as was done with the loss material 11 in Fig. 1 similar material designated 43 is shown in the interior of the guide. As in Fig. 1 this material may extend along the guide in such quantity as necessary to distribute the loss as desired. As an alternative the interior of the guide may be plated with high loss material such as iron or the attenuation may be obtained in any other desirable manner. In order to make a clear showing in the drawing the turns of the helix are shown in Fig. 3 more separated along the axis than would ordinarily be the case in an actual device. The turns may be as close together as desired or in actual contact as illustrated in the fragmentary sketch Fig. 3-A which shows an end portion of a helix adaptable to Fig. 3. It is obvious that the equivalent of Fig. 3-A may be had by placing a spiral of edge wound flat conductor inside and in contact with a conducting cylinder. This subject-matter is disclosed and claimed in my copending application Serial No. 304,536, filed August 15, 1952.

In the Fig. 4 embodiment of the invention a section of cylindrical wave guide with transverse conducting partitions or baffles provides the transmission path through the amplifying device. The partitions or baffles function to reduce the velocity of the wave through the guide so that the axial velocity of the wave and the velocity of an electron stream along the axis may be about the same. In Fig. 4 the shell 50 of the wave guide 49 is a part of the evacuated envelope and is sealed to the glass portion of the envelope 51. In this showing the transmission path external to the device is a coaxial line. This line is broken for insertion of the wave guide portion of the device, conductors 53 and 54 being joined to the input end of the device and conductors 55 and 56 being joined in the output end. The insulating beads 57 shown at both places where the coaxial structure joins the wave guide and where the lead to the collector 9 enters the guide are to maintain closure of the evacuated envelope. The inner conductors 53 and 55 are terminated in loops as shown to couple with and provide for the transfer of high frequency energy to and from the wave guide. Other types of path external to the wave guide portion of the device and other suitable coupling arrangements may be employed.

The baffles or transverse partitions 58 are of conducting material and are in electrical contact with the shell 50 of the guide so that each baffle closes the guide transversely except for the apertures therein such as 59 and 60. The apertures 59 are aligned along the axis of the guide. They provide for transmission of the high frequency wave through the guide and permit projection of an electron stream along the axis to interact with the axial electric field associated with the traveling wave. The apertures 60 located out from the center or axis of the guide may or may not be provided. The transverse baffles with the central apertures 59 only will act to slow the axial velocity of the high frequency wave through the guide to that of the electron stream in the same direction so that the desired interaction may be had as has been previously described. The apertures 60 may be provided to furnish additional direct coupling between the opposite sides of each baffle to give a desirable band-pass filter characteristic to the transmission of the guide and facilitate the amplification of a wide band of frequencies. In order to provide desirable high frequency attenuation as in the previously described embodiments, loss material 61 is placed in the interior of the guide. This material may be distributed along the guide as required for proper distribution of the transmission loss. The desired loss may be had by other means such as by using high loss material in the guide structure or by plating portions of it with high loss material.

Except for the enclosing envelope for the evacuated space and the differently shaped accelerating electrode 52 taking the place of the electrode 8, the arrangement for projecting the electron stream along the high frequency wave transmission path is the same as shown for the previously described embodiments and the various similar components are designated as in the previous figures. The operation of the embodiment shown in Fig. 4 to amplify a high frequency wave transmitted therethrough is the same as described in connection with the previous figures.

Fig. 5 is a modification of Fig. 4 in which the central apertures in the baffles and ends of the wave guide have been fitted with lengths of conductive hollow cylinders or tubes 65 and 66. These cylinders further isolate the spaces between the baffles so that the wave guide becomes in effect a series of toroidal-shaped resonators placed end-to-end and coupled through the apertures between them. The characteristic of the transmission path through the guide here also is that of a band-pass filter. The velocity of the high frequency wave along the axis of the cylinders 65 is slowed to approximate that of the electron stream projected therethrough and amplification of the wave is obtained as in the embodiments described.

Figs. 5-A and 5-B are face views of one of the baffles 58 of Fig. 5. Fig. 5-A shows more clearly the shape of the openings 60 of Fig. 5. Fig. 5-B shows at 90, 91 and 92 openings alternative to the openings 60 which may be used when it is desired to control the filter characteristic through alteration of the resonant characteristics of the openings coupling the various sections of the filter as will be referred to later.

Fig. 6 shows a modification of Fig. 5 in which the cylinders 65 are supported by conducting rods 68 rather than by the baffles. It may be considered that the apertures 60 of Fig. 5 have been so enlarged that the baffles 58 of Fig. 5 have contracted to become the rod supports 68. Like the Fig. 5 device the high frequency transmission characteristic is that of a band-pass filter. The coaxial line connections to the input and output ends of the guide are made by tapping the central coaxial conductors appropriately along the end supporting rods as shown. Loss material 69 is inserted as required to provide a desired distribution of attenuation in the transmission path as previously explained. The electron stream along the axis of the device is produced as in the previously shown embodiments and in the same manner amplification of a high frequency wave passing through the device is had by making the axial velocities of the wave and the electron stream substantially alike.

Fig. 6–A shows a modification of the Fig. 6 arrangement to illustrate how conductors 70 interconnecting the cylinders 65 and 66 may be used to add inductive elements and vary the filter type characteristic of the transmission path. The characteristic may be varied by altering the lengths and other characteristics of the conductors 70 to alter the inductance introduced by them.

Fig. 6–B illustrates an alternative to the Fig. 6–A arrangement. Here the conductors 95 joining the adjacent cylinders take the place of the conductors 70 in Fig. 6–A and provide similar facilities.

It has been indicated above that in the operation of the various embodiments of the invention the velocities of the high frequency wave and the electron stream should be substantially the same along the common path. Where the energy to be amplified covers a band of frequencies it is desirable that this relation hold over the whole band and this does not present any difficulty where the transmission path is a uniform line. However, when an arrangement (such as that of Fig. 5 or Fig. 6) having a band-pass filter characteristic is employed, special precautions are required in order to approach the desired condition as nearly as possible. This is especially so when the operating band of frequencies is an appreciable portion of the pass-band of the filter circuit, and is due to the fact that the phase changes over the pass-band between filter sections inherent in the filter circuit tend to change the phase relation between the electrons and the electric wave along their path through the device.

Consider first the case of a uniform transmission line with a wave traveling along it with the velocity $v$. The phase difference or angle between any two points along the line may be plotted against the angular frequency as shown in Fig. 9 where $\varphi$ is the phase angle or difference,
$\omega$ is the angular frequency, and $$\varphi=\frac{\omega L}{v}$$

where

L is the distance along the line between the two points and
$v$ is the velocity of the wave along the line.

Now, in order for the electrons to "keep up with" or travel at the same speed as the wave at all frequencies, it is only necessary to make the velocity of the electrons ($u_0$) the same as the wave velocity ($v$).

$$u_0=v$$

as the curve of Fig. 9 is a straight line and when $u_0=v$ the "electronic phase difference"

$$\frac{\omega L}{u_0}$$

is equal to the "circuit phase difference"

$$\frac{\omega L}{v}$$

for any length L or frequency $\omega$.

When we have a band-pass filter rather than a uniform line, the case is somewhat different. In going through the frequency band, the phase difference between sections of the filter changes by a definite amount. This change is $\pi$ radians for many filters and if phase difference is plotted against frequency for such a filter, we may get curves as shown in Fig. 10 where $\varphi$ is the phase angle or difference,
$\omega$ is the angular frequency,
$\omega_0$ is the angular frequency at mid-band of the filter,
$\omega_a$ is the angular frequency at the lower cut-off of the filter
$\omega_b$ is the angular frequency at the upper cut-off of the filter.

Three curves ($a$, $b$ and $c$) are shown in which the phase change ($\varphi$) between filter sections is shown as between 0 and $\pi$, $2\pi$ and $3\pi$ and $4\pi$ and $5\pi$ respectively over the pass-band $\omega_a$ to $\omega_b$. The same sort of operation is had whether it is said the phase changes from 0 to $\pi$, from $2\pi$ to $3\pi$, from $4\pi$ to $5\pi$ or from $0+2n\pi$ to $\pi+2n\pi$ where $n$ is an integer because at a given frequency a change in phase by $2n\pi$ means no change in phase at all. Hence for the purpose of this discussion the curves $a$, $b$ and $c$ are all equally good representations of the phase characteristic of the filter.

In order to define the velocity of the wave, let the phase difference between sections at mid-band frequency $\omega_0$ be $\varphi_n=\varphi_0+2n\pi$. Thus, $\varphi_0+2n\pi$ is a general expression for the phase change in a section of the filter at the mid-band frequency and $n$ may be any integer. Then the velocity $v$ of the wave must be such that $$\frac{\omega_0 l}{v}=\varphi_0+2n\pi$$

from which $$v=\frac{\omega_0 l}{\varphi_0+2n\pi}$$

where $l$ is the distance between sections of the filter, which in Figs. 5 and 6 is the distance between corresponding points in successive spaces between cylinders 65.

Any of several velocities may be chosen taking different values of $n$ and if the electrons are given a velocity $$u_0=\frac{\omega_0 l}{\varphi_0+2n\pi}$$

the "electronic phase difference" will equal the "circuit phase difference" at mid-band frequency $\omega_0$. In order to make these phase differences equal over a band of frequencies including the mid-frequency, the rate of change of the two must be made the same in that region.

The electronic phase change over a distance $l$ at any frequency with $u_0$ as chosen above is $$\varphi=\frac{\omega l}{u_0}=\frac{\omega l(\varphi_0+2n\pi)}{\omega_0 l}$$

$$\varphi=\frac{\omega}{\omega_0}(\varphi_0+2n\pi)$$

and the rate of change of electronic phase with frequency is $$\frac{\partial\varphi}{\partial\omega}=\frac{\varphi_0+2n\pi}{\omega_0}$$

The rate of change of circuit phase with frequency $$\left(\frac{\partial\varphi}{\partial\omega}\text{, circuit}\right)$$

should then be made substantially equal to the rate of change of electronic phase with frequency $$\frac{\partial\varphi}{\partial\omega}\text{, circuit}=\frac{\varphi_0+2n\pi}{\omega_0}$$

There are two ways of achieving this relation, (1) to vary $n$, (2) to vary $$\frac{\partial\varphi}{\partial\omega}\text{, circuit}$$

The rate of change of circuit phase with frequency $$\left(\frac{\partial\varphi}{\partial\omega}\text{, circuit}\right)$$

may be varied by using the well-known M derived filter sections commonly used in filter work. As M is made smaller $$\frac{\partial\varphi}{\partial\omega}\text{, circuit}$$

at mid-band becomes smaller and by choosing M properly the desired above relation may be satisfied.

In the circuit of Fig. 5, M may be controlled by using one or more resonant openings such as 90, 91, and 92 in the baffles 58 as shown in Fig. 5-B to couple betwen the resonators or filter sections. M is then controlled by adjusting the resonant frequencies and inductance/capacitance ratios of the openings.

In the circuit of Fig. 6 with the modification of Fig. 6-A or Fig. 6-B, M may be controlled by adjusting the length, height and thickness of the additional conductors 70 or 95 respectively connecting the sections.

In Figs. 4, 5, 5-A, 5-B, 6, 6-A, 6-B, 9 and 10 comprise the subject-matter of my copending application Serial No. 322,104, filed November 22, 1952.

Fig. 7 is the same as a figure in a copending application Serial No. 640,598, filed by the applicant January 11, 1946. It is reproduced here to illustrate a type of amplifier similar in some respects to that of the present invention and to which certain features of the present invention may be applied. The amplifier of the copending application as shown in Fig. 7 utilizes a wave guide structure with transverse baffles or partitions similar to those employed in Fig. 4 of the present invention to make the axial velocity of a wave transmitted therethrough sufficiently low. However, it will be noted that the high frequency wave is not transmitted directly through the device as in the various embodiments of the present invention which have been described. The Fig. 7 device employs two separate wave guide portions axially aligned but not electrically coupled. The input portion 73 is energized at high frequency from the input coaxial line 75 and is terminated by the resistor 77 which absorbs all of the high frequency energy transmitted through that portion of guide from the input coaxial. The output wave guide portion 74 is coupled to an output coaxial line 76 at the output end and is terminated at the other end by the resistor 78. An electron stream from the cathode 79 is projected along the axis through both guide portions. The solenoid 72 and energizing battery 71 are for maintaining a strong magnetic field in the direction of the electron path. All of the high frequency energy entering the device from the coaxial line 75 is utilized to modulate the electron stream as it passes through the guide portion 73 or is dissipated in losses or in the terminating resistor 77. The modulated electron stream then passes through the guide portion 74 and generates high frequency energy therein in accordance with the modulation and a high frequency output is delivered to the coaxial line 76. The coupling between input and output is electronic only and consequently a stoppage of the electron stream prevents transmission through the device. This is not the situation in the embodiments of the present invention shown in Figs. 1 to 6, inclusive, as in them there is a high frequency transmission path through regardless of the electron stream.

Fig. 8 illustrates in somewhat schematic form a modification of Fig. 1 which operates in a manner similar to the device of the applicant's copending application Serial No. 640,598, previously referred to, which is shown in Fig. 7 and has been briefly described above. An electron stream is projected as in earlier figures from the cathode 6 through the coil parts 81 and 82 to the collector 9.

As will be seen, in Fig. 8 the helical coil corresponding to the single continuous coil 10 of Fig. 1 is in two parts 81 and 82 and the adjacent ends in the center of the device are terminated in resistors 83 and 84 connecting the ends to the shield 85. A shield 86 is interposed between the two parts of the coil. There is, then, no direct high frequency transmission path through the device. The high frequency energy applied at the input through the coaxial line 1, 2 is completely dissipated in the helix 81 in modulating the electron stream, in losses and in the resistor 83. The modulated stream then generates in the helix 82 high frequency energy corresponding to the modulation and this high frequency energy is delivered to the output through the coaxial line 3, 4. The device thus may function as an amplifier in the same general manner as the device of Fig. 7. For simplicity, direct connections are shown between the helix and the coaxial lines. Ordinarily, it will be desirable to use a different coupling arrangement, for instance, such as is shown in Fig. 1.

The performance of the Fig. 8 arrangement may be simulated by a special design of the Fig. 1 embodiment in which the loss introduced by the material 11 is made sufficiently large near the center of the helix that the input energy is completely absorbed and the output energy is entirely generated in the output end portion of the helix. Obviously, the loss material may be designed to similarly modify the operation of other embodiments of the invention.

Also, it is evident that the arrangements of Figs. 5 and 6 may be modified to operate in the manner of Fig. 8 either by suitable design of the loss members 61 in Fig. 5 and 69 in Fig. 6 or by dividing the wave guide into two parts as illustrated in Fig. 7.

Other modifications of the invention will be apparent and the applicant does not wish to be limited to the exact details illustrated and described but only by the scope of the appended claims.

What is claimed is:

1. A wave amplifying device comprising a structure capable of guiding high frequency electrical waves, means to impress waves to be amplified upon an input end of said structure to permit travel of the waves therealong, electrode means for producing an electron stream adjacent to and along said wave guiding structure in a traveling electric field associated with the said traveling waves and in the direction of travel of that field, said stream entering said field as a substantially unmodulated stream, the region along said structure in which said electron stream traverses said electric field constituting a region wherein the electron stream and the field of the electric waves may interact to transfer energy, the said wave guiding structure having a transmission characteristic giving a propagation velocity of the said electric field substantially the same as the velocity of said electron stream whereby energy may be transferred from the electron stream to the said waves along the length of the said region of interaction, means for incorporating into the said wave guiding structure along said region of interaction high frequency loss to prevent self-oscillation of the device, and an output circuit connected to the end of the said wave guiding structure opposite the said input end.

2. A high frequency wave amplifying device comprising an electrical wave transmission circuit having an input end and an output end, means to impress waves to be amplified upon the input end of said circuit to permit travel of the waves therealong, electrode means for projecting an electron stream along at least a portion of said circuit in the direction of wave travel and in the electric field associated with said traveling waves, the said transmission circuit having a wave propagation characteristic making the velocity of the said waves therealong in the region of the said electron stream projected therealong substantially the same as the velocity of the stream, the said transmission circuit also being continuous in the sense that wave energy may be transmitted therealong from the input end to the output end whether or not the said electron stream and the attendant amplification are present and incorporating high frequency loss material in the region of said field through which said electron stream is projected designed to control tendency toward self-oscillation.

3. A wave amplifying device comprising a structure capable of guiding high frequency electrical waves, said structure comprising a conductor in the form of an elongated helix, means to impress waves to be amplified upon an input end of said structure to permit travel of the waves along said helix, electrode means for producing an electron stream along said helix parallel to its axis in a traveling electric field associated with the said traveling waves and in the direction of travel of that field, said stream entering said field as a substantially unmodulated stream, the region along said helix in which said electron stream traverses said electric field constituting a region wherein the electron stream and the field of the electric waves may interact to transfer energy, the said helix having a transmission characteristic giving a propagation velocity of the said electric field substantially the same as the velocity of said electron stream whereby energy may be transferred from the electron stream to the said waves along the length of the said region of interaction, means for incorporating into the said helix along said region of interaction high frequency loss to prevent self-oscillation of the device, and an output circuit connected to the end of the said wave guiding structure opposite the said input end.

4. A device according to claim 1 in which the said high frequency loss incorporated is uniformly distributed along the said region of interaction.

5. A device according to claim 1 in which the said high frequency loss incorporated is non-uniformly distributed along the said region of interaction.

6. A device according to claim 1 in which the said high frequency loss incorporated is introduced by means of loss material placed in the high frequency field of the said wave guiding structure whereby energy from the field may be dissipated in the material.

7. A device according to claim 1 in which the said high frequency loss incorporated is introduced by means of loss material incorporated into the conductor portion of the said wave guiding structure.

8. A device according to claim 3 in which the said high frequency loss incorporated is uniformly distributed along the said region of interaction.

9. A device according to claim 3 in which the said high frequency loss incorporated is non-uniformly distributed along the said region of interaction.

10. A device according to claim 3 in which the said high frequency loss incorporated is introduced by means of loss material placed in the high frequency field of the said helix whereby energy from the field may be dissipated in the material.

11. A device according to claim 3 in which the said high frequency loss incorporated is introduced by means of loss material incorporated into the conductor portion of the said helix.

12. A wave amplifying device comprising a transmission line having an input end and an output end, one side of said transmission line comprising a conductor in the form of an elongated helix in an evacuated enclosure, means for producing a beam of electrons traveling lengthwise of and in the field of said helix, means to connect a source of input waves to be amplified to said input end, said input connecting means comprising an input transmission line and two substantially parallel laterally spaced electrically coupled lengths of conductor, one length being connected to the said input transmission line and the other length being connected to the input end of the said helix, immediately adjacent thereto, the length of each said length of conductor being substantially electrically one-quarter wavelength of the wave to be amplified, and means to connect a load circuit for the amplified waves to the said output end.

13. A wave amplifying device comprising a transmission line having an input end and an output end, one side of said transmission line comprising a conductor in the form of an elongated helix in an evacuated enclosure, means for producing a beam of electrons traveling lengthwise of and in the field of said helix, means to connect a source of input waves to be amplified to said input end, said input connecting means comprising an input transmission line and two substantially parallel laterally spaced electrically coupled lengths of conductor, one length being connected to the said input transmission line and the other length being connected to the input end of the said helix immediately adjacent thereto, the length of each said length of conductor being substantially electrically $$\left(\frac{n}{2}+\frac{1}{4}\right)$$

wavelength of the wave to be amplified where $n$ is any integer, and means to connect a load circuit for the amplified waves to the output end.

14. A wave amplifying device comprising a transmission line having an input end and an output end, one side of said transmission line comprising a conductor in the form of an elongated helix in an evacuated enclosure, means for producing a beam of electrons traveling lengthwise of and in the field of said helix, means to connect a source of input waves to be amplified to said input end, means to connect a load circuit for the amplified waves to the said output end, said output connecting means comprising an output transmission line and two substantially parallel laterally spaced electrically coupled lengths of filamentary conductor, one length being connected to the said output transmission line and the other length being connected to the output end of the said helix, the length of each said length of conductor being substantially electrically one-quarter wavelength of the wave to be amplified.

15. A wave amplifying device comprising a transmission line having an input end and an output end, one side of said transmission line comprising a conductor in the form of an elongated helix in an evacuated enclosure, means for producing a beam of electrons traveling lengthwise of and in the field of said helix, means to connect a source of input waves to be amplified to said input end, means to connect a load circuit for the amplified waves to the said output end, said output connecting means comprising an output transmission line and two substantially parallel laterally spaced electrically coupled lengths of filamentary conductor, one length being connected to the said output transmission line and the other length being connected to the output end of the said helix immediately adjacent thereto, the length of each said length of conductor being substantially electrically $$\left(\frac{n}{2}+\frac{1}{4}\right)$$

wavelength of the wave to be amplified where $n$ is any integer.

16. A device according to claim 1 comprising also means to produce a strong unidirectional magnetic field along the said structure.

17. A device according to claim 3 comprising also means to produce a strong unidirectional magnetic field along the said structure.

18. A device according to claim 1 comprising also a shield of magnetic material surrounding the said structure.

19. A device according to claim 3 comprising also a shield of magnetic material surrounding the said structure.

20. A wave amplifying device comprising a transmission line having an input end and an output end, one side of said transmission line comprising a conductor in the form of an elongated helix in an evacuated enclosure, means for producing a beam of electrons traveling lengthwise of and in the field of said helix, means to connect a source of input waves to be amplified to said input end and means to connect a load circuit for the amplified waves to the said output end, at least one of said connecting means comprising a hollow wave guide and a length of conductor which is located in the field of the wave guide and connected to one of the ends of the said helix.

21. A device according to claim 20 in which the said wave guide includes in its interior a tapered fin-like member of conducting material in contact with the shell of the guide and extending inwardly therefrom in the region of the said length of conductor connected to the helix whereby the field of the guide is concentrated in the vicinity of the said length of conductor.

22. A wave amplifying device comprising a transmission line having an input end and an output end, one side of said transmission line comprising a conductor in the form of an elongated helix in an evacuated enclosure, means for producing a beam of electrons traveling lengthwise of and in the field of said helix, means to connect a source of input waves to be amplified to said input end, and means to connect a load circuit for the amplified waves to the said output end, at least one of said connecting means comprising a hollow wave guide and a length of conductor which is located in the field of the wave guide and connected to one of the ends of the said helix, the length of the said length of conductor being substantially electrically one-quarter wavelength of the wave to be amplified, the said wave guide extending beyond the location of the said length of conductor and means for tuning the portion of guide so extending.

23. A wave amplifying device comprising a transmission line having an input end and an output end, one side of said transmission line comprising a conductor in the form of an elongated helix in an evacuated enclosure, means for producing a beam of electrons traveling lengthwise of and in the field of said helix, means to connect a source of input waves to be amplified to said input end, and means to connect a load circuit for the amplified waves to the said output end at least one of said connecting means comprising a hollow wave guide and a length of conductor which is located in the field of the wave guide and connected to one of the ends of the said helix, the length of the said length of conductor being substantially electrically $$\left(\frac{n}{2}+\frac{1}{4}\right)$$

wavelength of the wave to be amplified where $n$ is any integer, the said wave guide extending beyond the location of the said length of conductor and means for tuning the portion of guide so extending.

24. A wave amplifying device comprising an input transmission line and an output transmission line, one side of each said transmission line comprising a conductor in the form of an elongated helix, both said helices being axially aligned and in the same evacuated enclosure, means for producing a stream of electrons traveling along a path lengthwise of and in the fields of said helices, the stream passing first through the field of the input helix and then through the field of the output helix, means to connect a source of input waves to be amplified to the end of the input helix nearer the beginning of the said electron path, means to connect a load circuit for the amplified waves to the end of the output helix farther from the beginning of the said electron path, means terminating the said transmission lines with impedances at the other ends of the said helices and an apertured shield between the two helices whereby the helices are electrically shielded from each other while the aperture in the shield permits passage of the electron stream serially through the fields of the helices.

25. A wave amplifying device comprising a transmission line one side of which comprises a conductor in the form of an elongated helix in an evacuated enclosure, means for producing a stream of electrons traveling along a path lengthwise of and in the field of said helix, means to connect a source of input waves to be amplified to the end of the helix nearer the beginning of the said electron path, means to connect a load circuit for the amplified waves to the other end of the helix, and means introducing high frequency loss in a region of the helix between the two ends in such degree as to absorb substantially all of the input wave energy whereby substantially no input wave energy is transmitted through the helix to the load circuit except through the agency of the said electron stream.

26. A wave amplifying device comprising a transmission circuit capable of guiding high frequency electrical waves and producing an electric field associated with such waves traveling at a predetermined propagation velocity, means to impress waves to be amplified upon an input end of said transmission circuit to permit travel of the waves therealong, electrode means for producing an electron stream having substantially the same said velocity along said circuit in said traveling electric field associated with the said traveling waves and in the direction of travel of that field, said stream entering said field as a substantially unmodulated stream, whereby energy is transferred from the electron stream to the said waves along the length of the said circuit in the region where said traveling field is traversed by the electron stream, means associated with said transmission circuit for incorporating therein in said region high frequency loss whereby there is introduced substantial attenuation to waves in the circuit while permitting a net amplification of waves traveling in the direction of the said electron stream, and an output circuit connected to the end of the said transmission circuit opposite the said input end.

27. A wave amplifying device comprising a transmission circuit capable of guiding high frequency electrical waves and producing an electric field associated with such waves traveling at a predetermined propagation velocity, said transmission circuit comprising a conductor in the form of an elongated helix, means to impress waves to be amplified upon an input end of said transmission circuit to permit travel of the waves therealong, electrode means for producing an electron stream having substantially the same said velocity along said circuit in said traveling electric field associated with the said traveling waves and in the direction of travel of that field, said stream entering said field as a substantially unmodulated stream, whereby energy is transferred from the electron stream to the said waves along the length of the said circuit in the region where said traveling field is traversed by the electron stream, and an output circuit connected to the end of the said transmission circuit opposite the said input end, the said helical conductor being of material having substantially higher resistance than copper whereby substantial attenuation to said electrical waves is introduced into the said circuit in said region.

28. Electric discharge apparatus comprising an input circuit carrying waves to be amplified, an output circuit for the amplified waves, a transmission line connecting the input circuit and the output circuit, means providing a beam of charged particles directed longitudinally along said line in the forward direction from said input circuit toward said output circuit within the field of waves traversing said line, means within said line to reduce the forward longitudinal component of velocity of waves traveling therealong to substantially the longitudinal velocity of the charged particles composing said beam, the velocity of the said charged particles being suitably related to the forward longitudinal component of velocity of said waves in said line to produce amplification of said waves in their travel along said line from said input circuit to said output circuit, the said line comprising means located in the region where said beam is within said field to increase its high frequency transmission loss substantially above that inherent in a line of normal construction for merely transmission purposes.

29. In combination in an electric discharge apparatus, an untuned input circuit, an untuned output circuit and an untuned transmission line connecting said input circuit to said output circuit, means to provide a beam of charged particles moving with a given velocity lengthwise along said line in the direction from said input circuit toward said output circuit and within the field of electrical waves traversing said line, said line including means reducing the longitudinal velocity of said waves to substantially the velocity of said beam, said line having a length of exposure to said beam over a distance of several wavelengths and interacting with said beam throughout said distance to modulate the beam in accordance with the waves traversing said line and reciprocally to cause amplification of said waves by abstraction of energy from said modulated beam, said line including also means located in said length of exposure to said beam for increasing its transmission loss substantially above that inherent in a line similar but constructed as normally for merely transmission purposes.

30. In an electric discharge device, a coaxial transmission line comprising as its inner conductor a helical conductor, means to impress waves upon one end of said line for amplification by said device, means to derive the amplified waves from the opposite end of said line, means to produce an electron stream lengthwise along the helix forming said inner conductor and within the field of waves traversing said inner conductor for a distance covering several wavelengths of said waves traversing said helical conductor, the propagation velocity of said waves along the axis of said helical conductor being substantially the same as the velocity of said electron stream whereby amplification of waves in said conductor is obtained by interaction with said stream, the said helical conductor being of material to give it substantially higher resistance to the transmission of said waves than if the material were copper.

31. A wave amplifying device having an input and an output terminal, therebetween an extended structure capable of propagating a traveling wave, means within the device for producing an extended electron stream parallel to and inductively related to said structure, and material disposed in the region in which the electron stream parallels said structure to attenuate substantially waves traveling along said structure in said region whereby there is a net attenuation to waves traveling therealong in the direction from said output terminal to said input terminal.

32. An electronic translating device characterized by an extended electron beam along a path, a transmission line which extends along said beam path and is capable of supporting a progressive electric wave which increases in amplitude with travel in the direction of said beam as a result of interaction with said electron beam in an extended region along its length, and means within the region of said interaction for attenuating waves as they travel along said line in said region of interaction whereby there is produced a net attenuation to waves traveling counter to the electron beam.

33. An amplifying device having an electron beam and a transmission structure extending along a portion of said beam in coupling relation thereto and capable of propagating a traveling wave, said electron beam and said traveling wave interacting continuously along said portion of beam, and loss material associated with said structure and located along said portion of beam giving substantial attenuation of waves in course of travel in the direction counter to the beam while permitting net amplification in the direction of the beam.

34. A wave amplifying device comprising an input transmission line and an output transmission line, one side of each said transmission line comprising a conductor in the form of an elongated helix, both said helices being axially aligned and in the same evacuated enclosure, means for producing a stream of electrons traveling along a path lengthwise of and in the fields of said helices, the stream passing first through the field of the input helix and then through the field of the output helix, means to connect a source of input waves to be amplified to the end of the input helix nearer the beginning of the said electron path, means to connect a load circuit for the amplified waves to the end of the output helix farther from the beginning of the said electron path, and means for terminating the said transmission lines with impedances at the other ends of the said helices.

35. A device according to claim 1, in which said means for incorporating high frequency loss comprises loss material which is separate from said wave-guiding structure and is located in said electric field of the wave-guiding structure.

36. A device according to claim 3, in which said means for incorporating high frequency loss comprises loss material separate from said helical conductor and located in said region of interaction.

37. A device according to claim 3, in which said means for incorporating high frequency loss is distributed along said helix but is less than co-extensive therewith.

38. A device according to claim 31, in which said wave-attenuating material associated with said structure is separate from said structure.

39. A wave-amplifying device comprising a transmission circuit capable of propagating high frequency electrical waves therealong at a velocity within the range of practical electron velocities and producing a traveling electric field associated with such waves through which an electron stream may be projected, means for impressing waves to be amplified upon an input end of said transmission circuit to permit travel of the waves therealong, electrode means for producing an electron stream along said circuit in the region of said electric field and in the direction of travel of said field to interact therewith, whereby an interchange of energy is effected, and means comprising a member of insulating material carrying loss material capable of absorbing high frequency energy located adjacent to said circuit and in the region of said electric field for introducing substantial attenuation into said circuit.

40. A wave-amplifying device according to claim 39, in which said transmission circuit comprises a conductor in the form of an elongated helix.

41. A wave-amplifying device according to claim 39, in which said loss material is distributed along said circuit over a portion only of the length thereof.

42. A wave-amplifying device comprising a transmission circuit comprising a conductor in the form of an elongated helix capable of propagating high frequency electrical waves therealong at a velocity within the range of practical electron velocities and producing a traveling electric field associated with such waves through which an electron stream may be projected, means coupled to an input end of said circuit for impressing waves to be amplified thereupon to permit travel of the waves and the associated electric field along said helix, means coupled to an output end of said circuit for coupling an output circuit for amplified waves, electrode means within said device for producing an electron stream along said helix in the region of said electric field at a velocity substantially the same as the velocity of said traveling electric field and in the direction of travel of said field to interact therewith, whereby an interchange of energy is effected, and a loss element located adjacent to said helix in the region of said field and extending longitudinally of the helix over a distance that is less than the length of the helix, said loss element comprising a member of insulating material carrying loss material capable of absorbing high frequency energy from said field.

43. A wave translating device having an extended structure capable of propagating a traveling wave, means within the device for producing an extended electron stream parallel to and inductively related to said structure, and energy absorbing means electrically interposed between points on said structure that are spaced apart in the direction of wave propagation in the region in which said stream and structure are inductively related to substantially block transmission of electromagnetic waves on the structure from one said point to the other.

44. A wave translating device having an input section and an output section each said section comprising an extended structure capable of propagating a traveling wave, means within the device for producing an extended electron stream parallel to and inductively related to both said structures and energy absorbing means electrically interposed between said sections to substantially block transmission of electromagnetic waves from one said section to the other.

45. A wave translating device having an extended structure capable of propagating a traveling wave, means within the device for producing an extended electron stream parallel to and inductively related to said structure, and energy absorbing means electrically interposed between points on said structure that are spaced apart in the direction of wave propagation in the region in which said stream and structure are inductively related to substantially attenuate electromagnetic waves traveling on said structure from one said point to the other.

46. A device according to claim 1 in which the said means for incorporating high frequency loss comprises a member of loss material in cylindrical form placed in the high frequency field of the said wave-guiding structure with its axis substantially parallel to said direction of field travel whereby energy from the field may be dissipated in the material.

47. A device according to claim 45 in which the said energy absorbing means comprises a member of loss material in cylindrical form located in the high frequency field of said structure with its axis substantially parallel to the structure.

48. In an electrical discharge device, means for producing a stream of charged particles, a pair of physically spaced helical conductors arranged substantially in an end-to-end relation and adjacent the path of said stream and having their axes parallel to the path of said stream, whereby said helical conductors are in energy coupling relation to said stream, resistive means terminating each of the adjacent ends of said helical conductors for preventing reflection of waves traveling along said conductors, an input line coupled to the opposite end of that helical conductor which is located nearest to said particle producing means for supplying alternating current energy thereto, for affecting said stream, and means coupled to the opposite end of other helical conductor for deriving alternating current therefrom.

49. An electron discharge device comprising two spaced helical conductors arranged end-to-end within an evacuated envelope, means between said two conductors for preventing the propagation of energy from the output to the input, one of said conductors constituting an input coil and the other an output coil, means near one end of the input coil for producing a stream of charged particles adapted to be projected parallel to the helical conductors, means along the path of the helical conductors for focusing the stream of charged particles, means coupled to said input coil for applying signal energy thereto, and means coupled to said output helical coil for deriving energy therefrom.

50. An electron discharge device comprising two axially-aligned spaced helical conductors constituting input and output coils, shielding means enclosing said coils, resistive means connected between each of the adjacent ends of said coils and said shielding means for preventing reflection of waves traveling along said coils, means coupled to the opposite end of said input coil for applying signal energy thereto, means coupled to the opposite end of said output coil for deriving energy therefrom, and means adjacent said opposite end of said input coil for producing a stream of electrons along a path extending through said coils.

JOHN R. PIERCE.

References Cited in the file of this patent

UNITED STATES PATENTS

| Number | Name | Date |
|---|---|---|
| Re. 21,739 | Llewellyn | Mar. 4, 1941 |
| 2,088,749 | King | Aug. 3, 1937 |
| 2,122,538 | Potter | July 5, 1938 |
| 2,197,123 | King | Apr. 16, 1940 |
| 2,233,126 | Haeff | Feb. 25, 1941 |
| 2,300,052 | Lindenblad | Oct. 27, 1942 |
| 2,367,295 | Llewellyn | Jan. 16, 1945 |
| 2,368,031 | Llewellyn | Jan. 23, 1945 |
| 2,429,243 | Snow et al. | Oct. 21, 1947 |